US012124089B2

(12) United States Patent
Ma et al.

(10) Patent No.: US 12,124,089 B2
(45) Date of Patent: Oct. 22, 2024

(54) OPTICAL CONNECTOR ASSEMBLY (71) Applicant: 3M INNOVATIVE PROPERTIES COMPANY, St. Paul, MN (US)

(72) Inventors: Changbao Ma, Austin, TX (US); Alexander W. Barr, Austin, TX (US); Daniel F. Cronch, Denver, CO (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 210 days.

(21) Appl. No.: 17/786,023

(22) PCT Filed: Dec. 8, 2020

(86) PCT No.: PCT/IB2020/061637
§ 371 (c)(1),
(2) Date: Jun. 16, 2022

(87) PCT Pub. No.: WO2021/124014
PCT Pub. Date: Jun. 24, 2021

(65) Prior Publication Data
US 2023/0016658 A1    Jan. 19, 2023

Related U.S. Application Data (60) Provisional application No. 62/949,092, filed on Dec. 17, 2019.

(51) Int. Cl.
*G02B 6/38*    (2006.01)
(52) U.S. Cl.
CPC ........... *G02B 6/3845* (2013.01); *G02B 6/383* (2013.01); *G02B 6/3885* (2013.01)
(58) Field of Classification Search
None
See application file for complete search history.

(56) References Cited

U.S. PATENT DOCUMENTS

2015/0219863 A1    8/2015 Haase et al.
2017/0168248 A1    6/2017 Hayauchi et al.
(Continued)

FOREIGN PATENT DOCUMENTS

JP    2015203844 A    11/2015
WO    2015142551 A1    9/2015

OTHER PUBLICATIONS

International Search Report for PCT International Application No. PCT/IB2020/061637, mailed on Mar. 2, 2021, 3 pages.

*Primary Examiner* — Jerry Rahll
(74) *Attorney, Agent, or Firm* — Jonathan L. Tolstedt (57) ABSTRACT An optical ferrule configured to move along a mating direction to mate with a mating optical ferrule. The optical ferrule includes an attachment portion for receiving and securing one or more optical waveguides. First and second engagement portions are formed integrally with the optical ferrule and spaced apart from each other along the mating direction. First and second engagement portions are formed integrally with the mating optical ferrule and spaced apart from each other along the mating direction. When the optical ferrule mates with the mating optical ferrule, the first and second engagement portions of the optical ferrule engage the respective second and first engagement portions of the mating optical ferrule. The engagement of the engagement portions of the optical ferrules prevents each of the optical ferules from moving relative to the other optical ferrule along at least mutually orthogonal first and second directions orthogonal to the mating direction.

10 Claims, 11 Drawing Sheets (56) References Cited

U.S. PATENT DOCUMENTS

2018/0275353 A1* 9/2018 Haase .................... G02B 6/389
2019/0212500 A1   7/2019 Haase et al.

* cited by examiner

OPTICAL CONNECTOR ASSEMBLY

CROSS REFERENCE TO RELATED APPLICATIONS

This application is a national stage filing under 35 U.S.C. 371 of PCT/IB2020/061637 filed Dec. 8, 2020, which claims the benefit of U.S. Provisional Application No. 62/949,092, filed Dec. 17, 2019, the disclosures of which are incorporated by reference in their entirety herein.

TECHNICAL FIELD

This disclosure relates generally to optical connector assemblies and optical ferrules.

BACKGROUND

Optical connectors can be used for optical communications in a variety of applications including telecommunications networks, local area networks, data center links, and internal links in computer devices. Optical communication can also be extended to applications inside smaller consumer electronic appliances such as laptops and cell phones. With the miniaturization of optical modules and optical fiber devices, optical fiber congestion can occur at optical interfaces and connection distribution points.

SUMMARY

Various aspects and embodiments described herein relate to optical connectors and optical ferrules.

Some aspects of the disclosure relate to an optical ferrule configured to mate with a mating optical ferrule. The optical ferrule includes opposing top and bottom major surfaces. The top surface includes an attachment portion for receiving and securing one or more optical waveguides. The top surface includes a light redirecting portion for changing a direction of light received from an optical waveguide received and secured in the attachment portion. First and second engagement portions are disposed at respective front and rear ends of, and integral to, the optical ferrule. The first and second engagement portions are spaced apart along a length direction of the optical ferrule. A mating optical ferrule includes first and second engagement portions disposed at respective front and rear ends of, and integral to, the mating optical ferrule and spaced apart along a length direction of the mating optical ferrule. When the optical ferrule mates with the mating optical ferrule, the first and second engagement portions of the optical ferrule engage the respective second and first engagement portions of the mating optical ferrule. The engagement prevents each of the optical ferules from moving relative to the other optical ferrule along at least mutually orthogonal first and second directions orthogonal to the length direction of the optical ferrule.

Some other aspects of the disclosure relate to an optical ferrule configured to move along a mating direction to mate with a mating optical ferrule. The optical ferrule includes an attachment portion for receiving and securing one or more optical waveguides. First and second engagement portions are formed integrally with the optical ferrule and spaced apart from each other along the mating direction. The mating optical ferrule includes first and second engagement portions formed integrally with the mating optical ferrule and spaced apart from each other along the mating direction. When the optical ferrule mates with the mating optical ferrule, the first and second engagement portions of the optical ferrule engage the respective second and first engagement portions of the mating optical ferrule. The engagement prevents each of the optical ferules from moving relative to the other optical ferrule along at least mutually orthogonal first and second directions orthogonal to the mating direction.

These and other aspects of the present application will be apparent from the detailed description below. In no event, however, should the above summaries be construed as limitations on the claimed subject matter, which subject matter is defined solely by the attached claims.

BRIEF DESCRIPTION OF DRAWINGS

The various aspects of the disclosure will be discussed in greater detail with reference to the accompanying figures where, FIG. 1 schematically shows optical ferrules mated with each other according to certain embodiments.

The figures are not necessarily to scale. Like numbers used in the figures refer to like components. However, it will be understood that the use of a number to refer to a component in a given figure is not intended to limit the component in another figure labelled with the same number.

DETAILED DESCRIPTION OF ILLUSTRATIVE EMBODIMENTS

In the following description, reference is made to the accompanying drawings that form a part hereof and in which various embodiments are shown by way of illustration. It is to be understood that other embodiments are contemplated and may be made without departing from the scope or spirit of the present description. The following detailed description, therefore, is not to be taken in a limiting sense.

Optical connectors can be used to connect multi-fiber ribbon cables, for example. A ribbon cable typically includes a plurality of optical fibers organized and molded side by side in a plastic ribbon. An optical connector may include an optical ferrule configured to receive optical fibers from a ribbon cable. Two mating optical ferrules with the same fiber spacing may be placed in an abutting relationship so that the ends of the fibers of the respective ferrules are substantially co-axially aligned with one another, thereby forming a multi-fiber connection. Mating of optical ferrules can utilize constant forward and normal forces that can be directly or indirectly applied to the ferrules. The force can be applied anywhere on the ferrule, as long as it does not interfere with other requirements. Bending of the multi-fiber ribbons may be used to provide the desired forward and normal forces to keep the ferrules mated to each other. However, bending of the fibers may create stress over time in the fibers themselves and in the bonding between the fibers and the ferrule. In some embodiments of the present disclosure, optical ferrules and/or optical connectors include features that generate the desired forward and normal forces substantially without using bending of the optical fibers to produce the desired forces.

Optical connectors including expanded beam optical connectors may include optical ferrules (also known as "light coupling units") that may be formed as unitary, molded structures. A unitary optical ferrule is a single piece structure that includes one or more elements for receiving and securing a waveguide, one or more elements for affecting light from the waveguide, and one or more alignment features. Optical connectors described herein include one or more optical cable assemblies disposed in a housing. The optical cable assemblies may include one waveguide or arrays of multiple parallel waveguides (typically 4, 8 or 12 or more parallel waveguides) attached to one or more optical ferrules.

As illustrated in FIGS. 1 to 4, an optical connector assembly includes an optical ferrule (100) and a mating optical ferrule (200). The optical ferrule (100) is configured to mate with the mating optical ferrule. In some aspects, the optical ferrule (100) may be configured to move along a mating direction (x-axis) and mate with the mating optical ferrule (200). In some embodiments, the optical ferrule may have more than one mating direction. For example, in some embodiments the optical ferrule may be adapted to be moved along a first mating direction, or along a second orthogonal mating direction, or along a vector sum of the first and second mating directions relative to a mating optical ferrule in order to mate with the mating optical ferrule.

In some aspects, the optical ferrules (100, 200) may have a unitary construction. In other aspects, the optical ferrule may be a ferrule that includes pieces formed separately and adhered or otherwise fastened together. The ferrule may be made from any suitable materials including polymers or ceramics. The ferrule may include one or more elements that guide or help guide the ferrule and a mating ferrule into alignment when the two ferrules are mated. In some aspects, either one of, or both, the optical ferrules (100, 200) may be hermaphroditic.

In some embodiments, an optical connector may include a housing and the optical ferrules may be assembled to the housing. The housing may function to prevent dirt from interfering with optical connections, for example. The housing may provide, in some instances, retention force to maintain the ferrules in positive contact, as well as a latching and release mechanism for mating and de-mating an optical connector. In addition, the housing can protect an optical ferrule from outputting stray light that can be a safety hazard to those nearby. In some embodiments, the housing may have a latching mechanism to prevent its accidental opening. In some embodiments, the housing may have a door mechanism that may be opened by the action of mating two connectors. The housing can have any suitable configuration for holding and securing the optical ferrule and for mating the optical connector to the mating optical connector.

Figure 4:
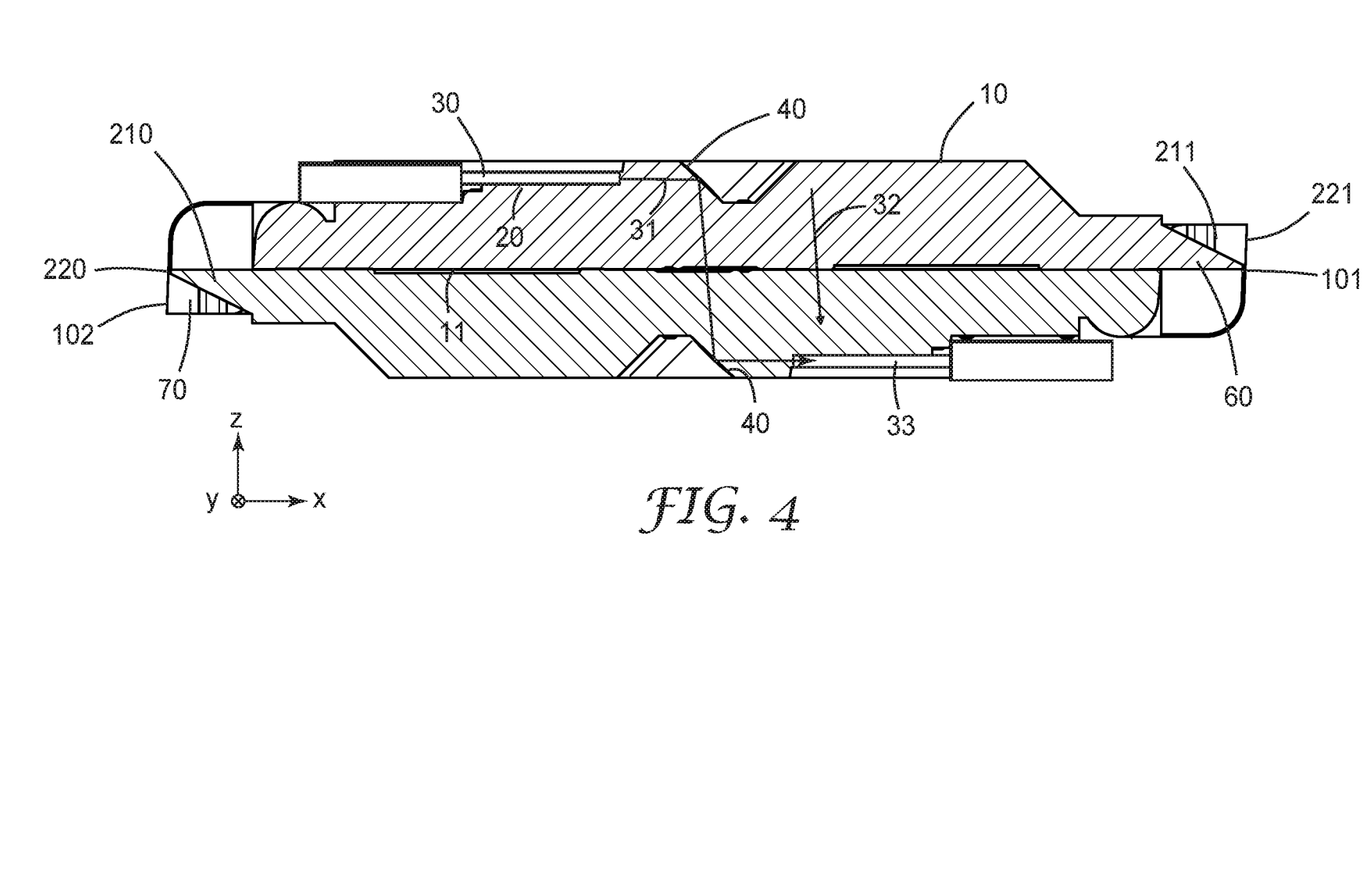
FIG. 4 schematically shows a cross sectional view of an optical ferrule mated with an optical mating ferrule according to certain aspects of the disclosure.

In some aspects, the optical ferrule (100) includes an attachment portion (20). In the illustrated embodiment, the optical ferrule (100) includes a top major surface (10) and an opposing bottom major surface (11) and the top surface (10) includes the attachment portion (20). The attachment portion (20) may be configured to receive and secure one or more optical waveguides (30) as shown in FIG. 4. In some embodiments, the one or more optical waveguides (30) may form a waveguide array of an optical cable. The term optical waveguide is used herein to refer to an optical element that propagates signal light. An optical waveguide may have at least one core with a cladding, wherein the core and cladding are configured to propagate light, e.g., by total internal reflection. An optical waveguide may be, for example, a single or multi-mode waveguide, a single core optical fiber, a multi-core optical fiber, a polymeric waveguide, or planar waveguides disposed on a substrate. A waveguide may have any suitable cross sectional shape, e.g., circular, square, rectangular etc. The individual waveguides in the waveguide array may be optical fibers made of glass with a protective buffer coating. Multiple parallel waveguides of a waveguide array may be enclosed by a jacket.

The attachment portion (20), according to some aspects, may include one or more attachment areas for receiving and securing one or more optical waveguides (30). The attachment portion (20) extends along a mating direction (x-axis). The optical waveguides (30) according to some embodiments may be optical fibers, and may be aligned in grooves provided in the attachment areas of the attachment portion (20) to which they are permanently attached. At the point of attachment, the fiber buffer coating and protective jacket (if any) of the waveguides (30) are stripped away to allow only the bare optical fibers to lie aligned and permanently affixed to the grooves in the attachment areas of the attachment portion (20).

Figure 1:
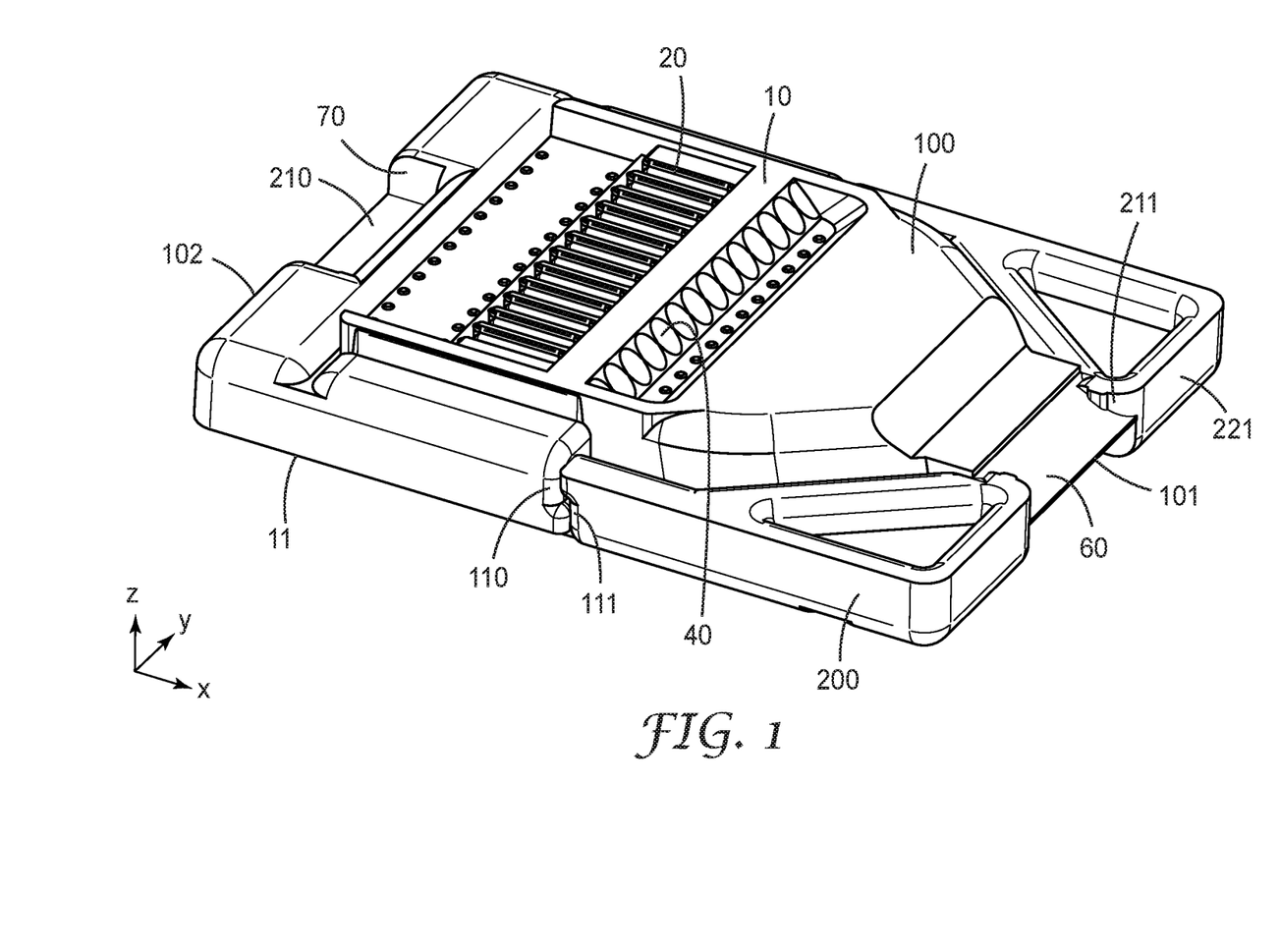

As shown in FIGS. 1 and 4, the top surface (10) of the optical ferrule (100) includes a light redirecting portion (40). The light redirecting portion (40) changes a direction (x-axis) of light (31) received from an optical waveguide (30) received and secured in the attachment portion (20). In some aspects, the light redirecting portion (40) may be configured to change the direction of light (31) received from the optical waveguide (30) received and secured in the attachment portion (20) by at least 45 degrees, or at least about 60 degrees. In some embodiments, the optical ferrule (100) and the mating optical ferrule (200) may each include an array of light redirecting elements in the light redirecting portion (40), at least one for each optical waveguide (30) in the waveguide array attached to respective ferrules. The exit ends of the optical waveguides (30) received and secured in the attachment portion (20) of the optical ferrule (100) may be situated so as to be able to direct light (31) emanating from each optical waveguide (30) into the input side or face of a corresponding light redirecting element in the light redirecting portion (40) of the mating ferrule (200). For example, in various embodiments, each light redirecting element in the light redirecting portion (40) has one or more of a prism, a lens, and a reflecting surface, such as a mirror or the like, to collimate light.

In some embodiments, the light redirecting portion (40) changes the direction of light received from an optical waveguide (30) received and secured in the attachment portion (20) from the length direction (x-axis) of the optical ferrule (100) to a different direction (32), as best seen in FIG. 4. The light (31) from the optical waveguide in the optical ferrule (100), which is reflected by the light redirecting portion (40) of the optical ferrule (100), is redirected to the light redirecting portion (40) of the mating optical ferrule (200). The light redirecting portion (40) of the mating optical ferrule (200) is oriented to focus the reflected light (31) into the optical waveguide (33) in the mating optical ferrule (200). In some other aspects, the light redirecting portion (40) may be configured to change the direction of the light (31) from the optical waveguide (30) received and secured in the attachment portion (20) primarily by total internal reflection (TIR). In some embodiments, the light redirecting elements in the light redirecting portion (40) may include a reflective coating, for example, or otherwise be made reflective.

The mating of the ferrules (100, 200) is maintained at a constant forward and normal force with respect to the ferrule. For instance, engagement portions may be integrally provided with the ferrules (100, 200) to maintain the mating of the ferrules at substantially constant forward and normal force with respect to the ferrules. According to the various illustrated embodiments, first (60) and second (70) engagement portions may be formed integrally with the optical ferrule (100). The first engagement portion (60) may be spaced apart from the second engagement portion (70) along the mating direction (x-axis). For instance, the first (60) and second (70) engagement portions may be disposed at respective front (101) and rear (102) ends of, and integral to, the optical ferrule (100) and spaced apart along a length direction (x-axis) of the optical ferrule (100). The mating optical ferrule (200) includes first (210) and second (211) engagement portions formed integrally with the mating optical ferrule (200). The first engagement portion (210) of the mating optical ferrule (200) may be spaced apart from the second engagement portion (211) of the mating optical ferrule (200) along the mating direction (x-axis). For instance, the first (210) and second (211) engagement portions may be disposed at respective front (220) and rear (221) ends of, and integral to, the mating optical ferrule (200) and spaced apart along a length direction (x-axis) of the mating optical ferrule (200).

According to certain aspects of the disclosure, when the optical ferrule (100) mates with the mating optical ferrule (200) the first (60) and second (70) engagement portions of the optical ferrule (100) engage the respective second (211) and first (210) engagement portions of the mating optical ferrule (200). The engagement of the engagement portions of the optical ferrule (100) with the respective engagement portions of the mating optical ferrule (200) prevents each of the optical ferules from moving relative to the other optical ferrule along at least mutually orthogonal first (y-axis) and second (z-axis) directions orthogonal to the mating direction (x-axis), or orthogonal to the length direction (x-axis) of the optical ferrule (100). The first (y-axis) and second (z-axis) directions, in some instances, are respective width and thickness directions of the optical ferrule.

In some embodiments, the engagement between the first (60) and second (70) engagement portions of the optical ferrule (100) and the respective second (211) and first (210) engagement portions of the mating optical ferrule (200) prevents each of the optical ferules from rotating relative to the other optical ferrule.

As illustrated in FIG. 1, in some embodiments, the optical ferrule (100) includes at least one mating stop (110). In some aspects, the mating stop (110) may be formed integrally with the optical ferrule (100). The mating stop (110) may be disposed between the first (60) and second (70) engagement portions. The mating optical ferrule (200) may include a corresponding mating stop (111). In some aspects, the corresponding mating stop (111) may be disposed between the first (210) and second (211) engagement portions of the mating optical ferrule (200). When the optical ferrule (100) mates with the mating optical ferrule (200), the mating stop (110) engages the corresponding mating stop (111) of the mating optical ferrule (200). In some aspects, each mating stop may include protrusions and recesses to interlock with each other. Engagement of the mating stops (110, 111) with each other prevents each of the optical ferules from further moving relative to the other optical ferrule along the length direction of the optical ferrule.

Figure 5:
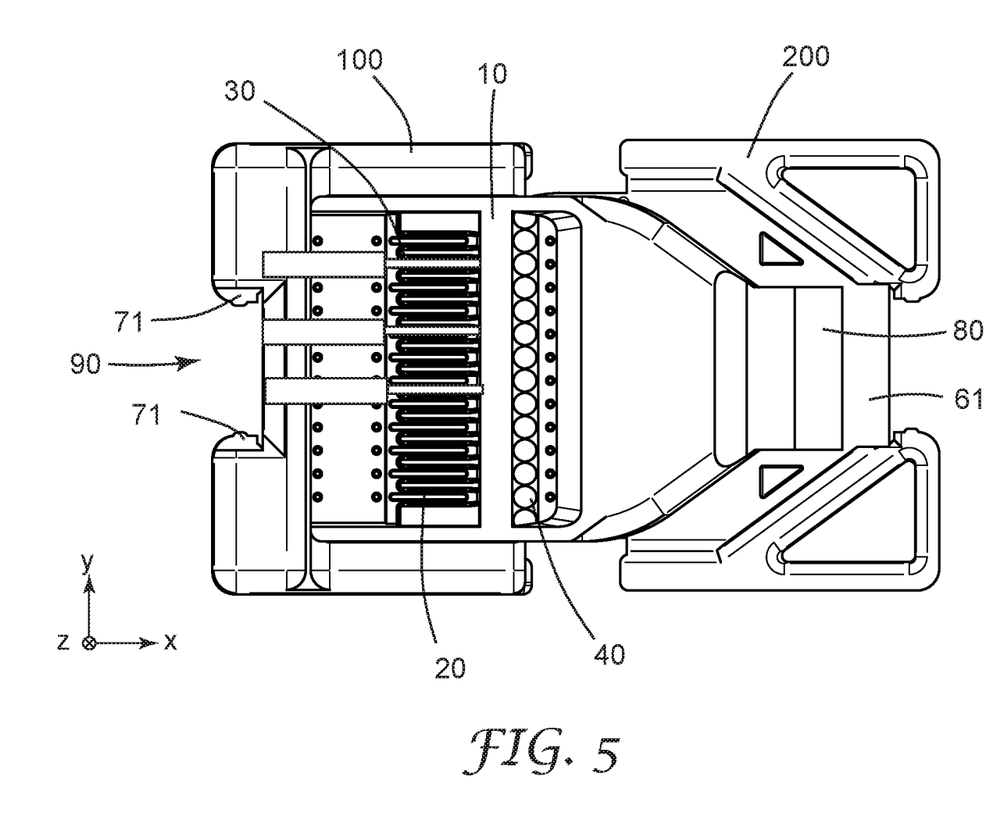
FIGS. 5 and 6 schematically show the top and bottom views of the mated optical ferrules.
Figure 6:
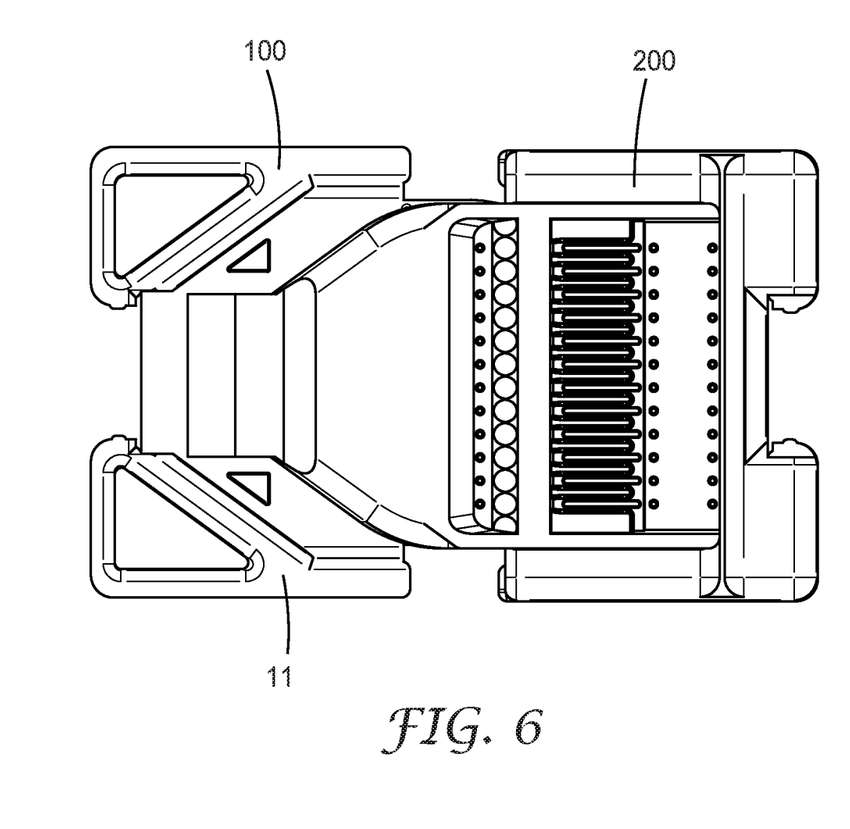

In some embodiments, as best illustrated in FIGS. 5 and 6, the first engagement portion (60, 210) of each optical ferrule (100, 200) includes a first inclined surface (61). The second engagement portion (70, 211) of each optical ferrule includes a pair of second inclined surfaces (71) spaced apart along a width direction (y-axis) of the optical ferrule. When the optical ferrule (100) mates with the mating optical ferrule (200), the first inclined surface (61) of the first engagement portion of each optical ferrule makes surface contact with each of the second inclined surfaces (71) of the second engagement portion of the other optical ferrule. The surface contact made by the inclined surfaces (61, 71) generates the pressing force suitable for retaining the ferrules in the mated position. The pressing force generated prevents each of the optical ferules from moving relative to the other optical ferrule along at least mutually orthogonal first (y-axis) and second (z-axis) directions orthogonal to the length direction of the optical ferrule. During operation, the surface contact between the inclined surfaces (61, 71) may be maintained such that the optical alignment of the ferrules in the mated condition remains unchanged.

The engagement portions of the optical ferrules may be of other configurations as illustrated in FIGS. 2 and 8-14. For instance, the first engagement portion (60) of each optical ferrule (100, 100', 100") may include a first projection (80, 80', 120) and the second engagement portion (70) of each optical ferrule may define a second opening (90, 90', 90"). The first projection and second opening may be formed such that when the optical ferrule (100) mates with the mating optical ferrule (200), the first projection (80, 80', 120) of the first engagement portion of each optical ferrule closely fits within the second opening (90, 90', 90") of the second engagement portion of the other optical ferrule. The first projection (80, 80', 120) closely fits within the second opening (90, 90', 90") so as to generate the pressing force suitable for retaining the ferrules in the mated position. The pressing force generated prevents each of the optical ferules from moving relative to the other optical ferrule along at least mutually orthogonal first (y-axis) and second (z-axis) directions orthogonal to the length direction of the optical ferrule. During operation, the close fit between the first projection of each optical ferrule and the second opening of the other optical ferrule maintains the optical alignment of the ferrules in the mated condition.

Figure 2:
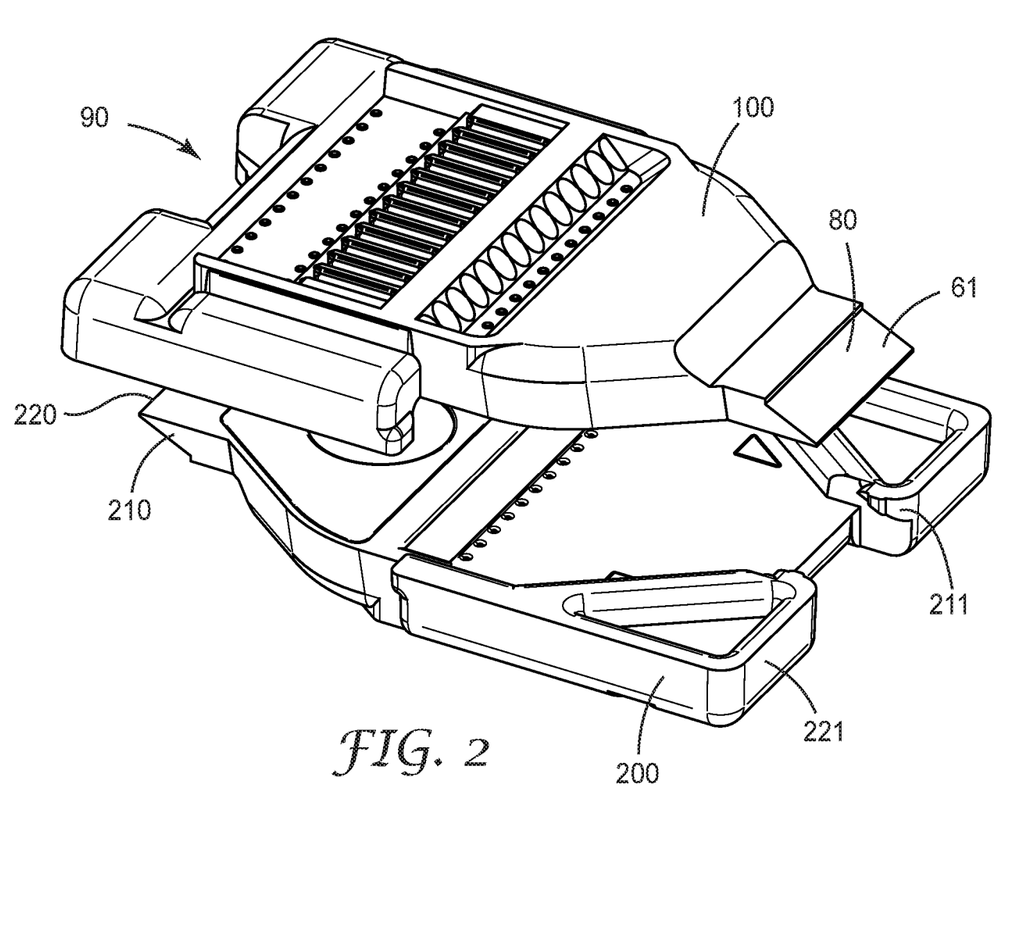
FIGS. 2 and 3 schematically show different views of the optical ferrule and the mating optical ferrule.
Figure 3:
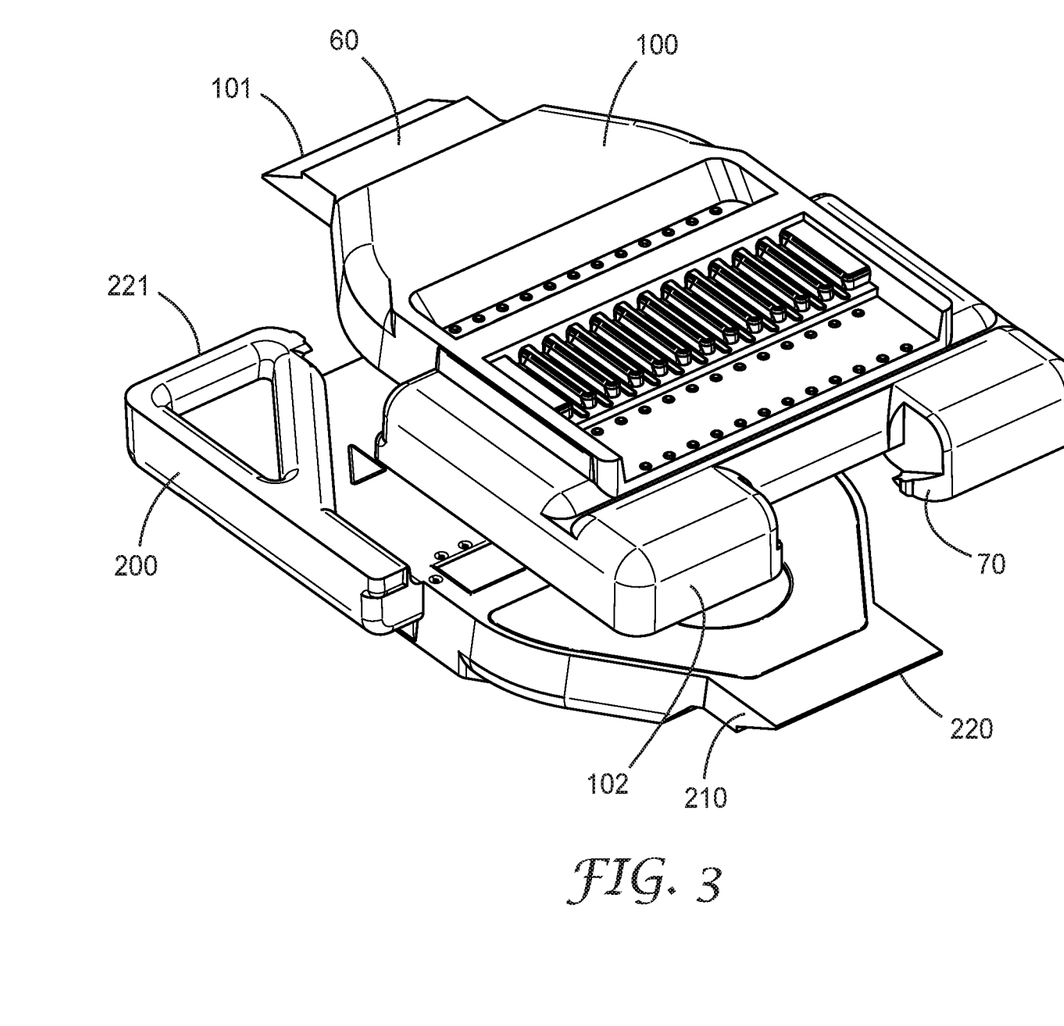

In the embodiment illustrated in FIGS. 2 and 5, the first projection (80) may include an inclined surface (61) and the second opening (90) may include a pair of second inclined surfaces (71) spaced apart along a width direction (y-axis) of the optical ferrule. When the optical ferrule (100) mates with the mating optical ferrule (200), the inclined surface (61) of the first projection (80) of each optical ferrule makes surface contact with each of the second inclined surfaces (71) formed in the second opening (90) of the other optical ferrule. During operation, the surface contact between the inclined surfaces (61, 71) maintains the optical alignment of the ferrules in the mated condition and prevents each of the optical ferules from moving relative to the other optical ferrule in at least directions orthogonal to the length direction of the optical ferrule.

Figure 8:
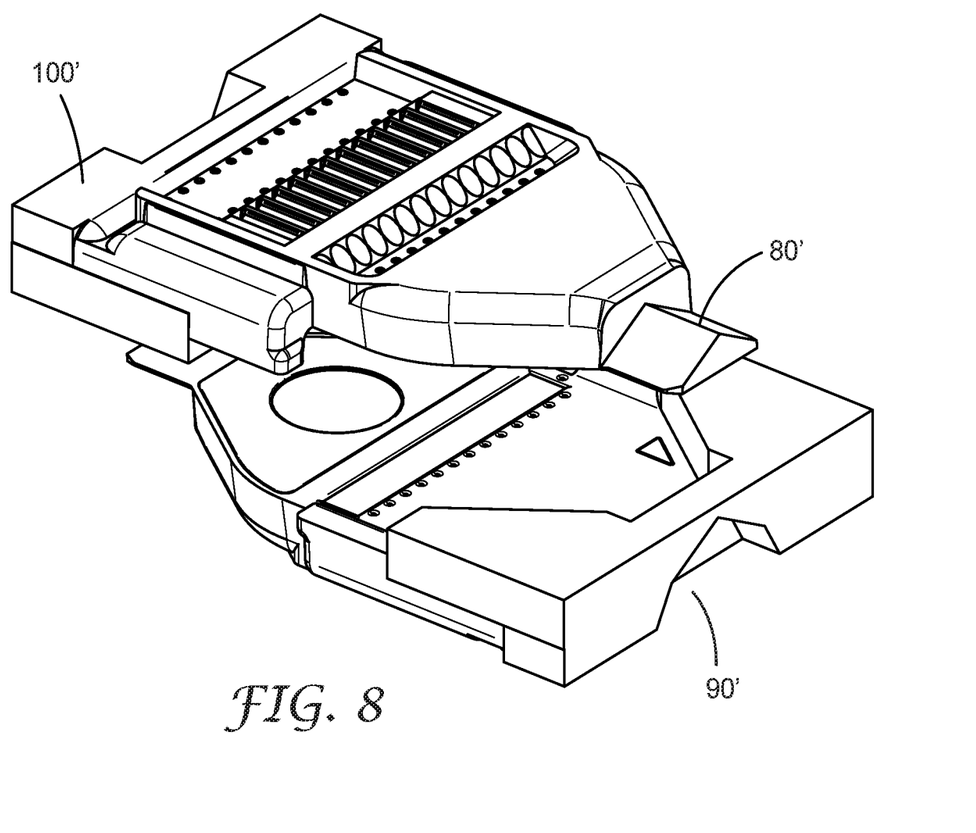
Figure 14:
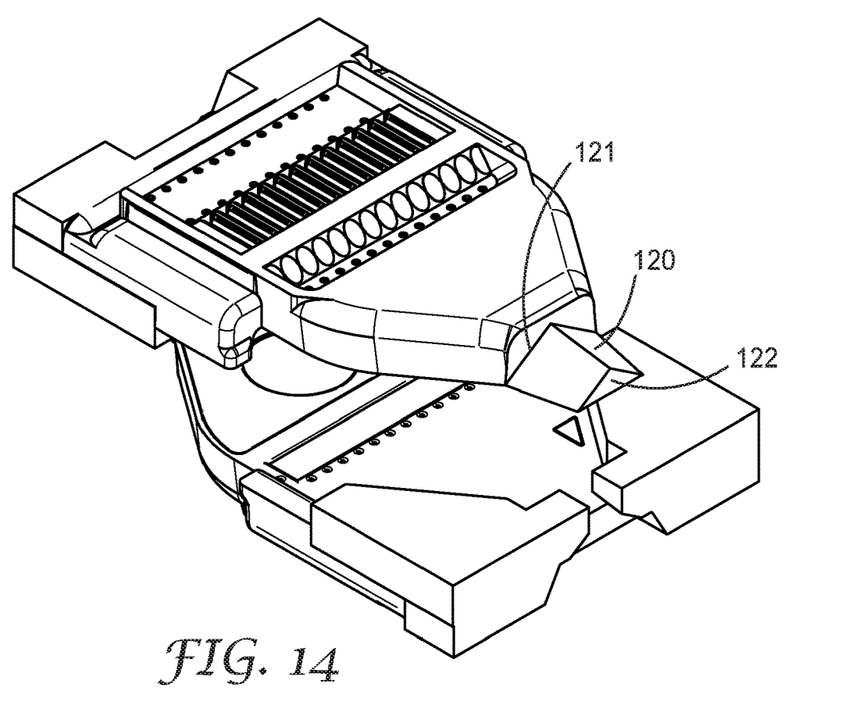
Figure 15:
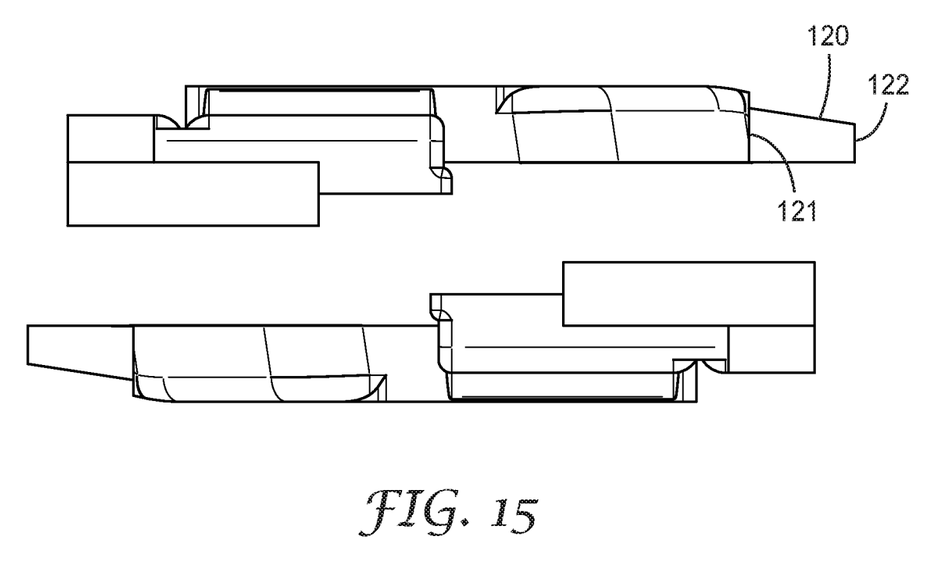

In some embodiments, the first projection (80', 120) has a prismatic shape, as best seen in FIGS. 8 and 14. In some aspects, as shown in FIGS. 14 and 15, the first projection (120) may taper from a larger back end (121) to a smaller front end (122).

Figure 7:
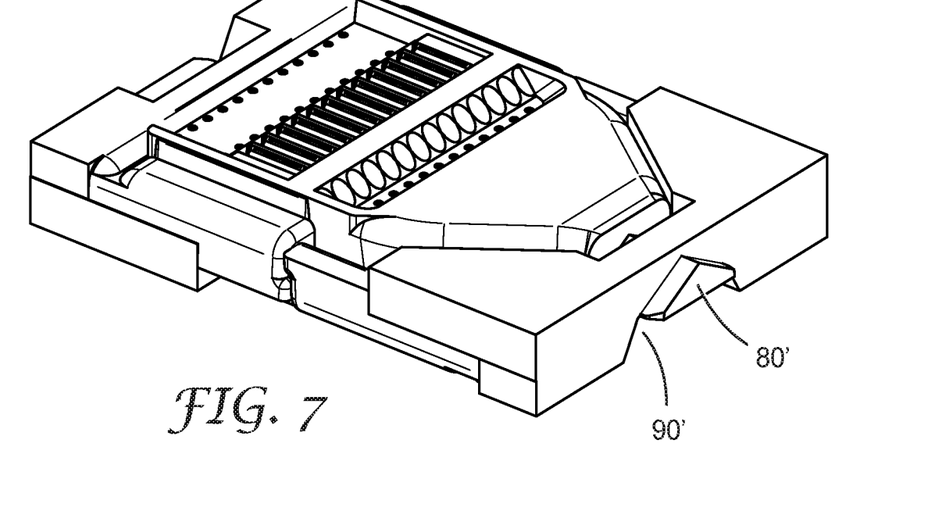
FIGS. 7-9 schematically show different assembled and exploded views of optical ferrules mated with each other according to some embodiments of the disclosure.
Figure 9:
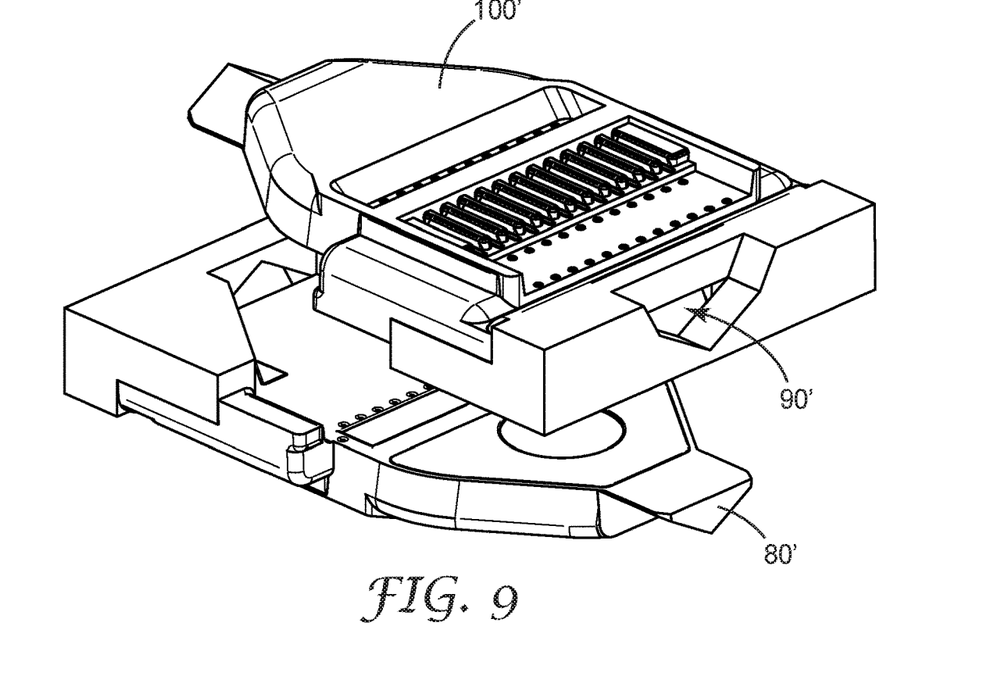
Figure 10:
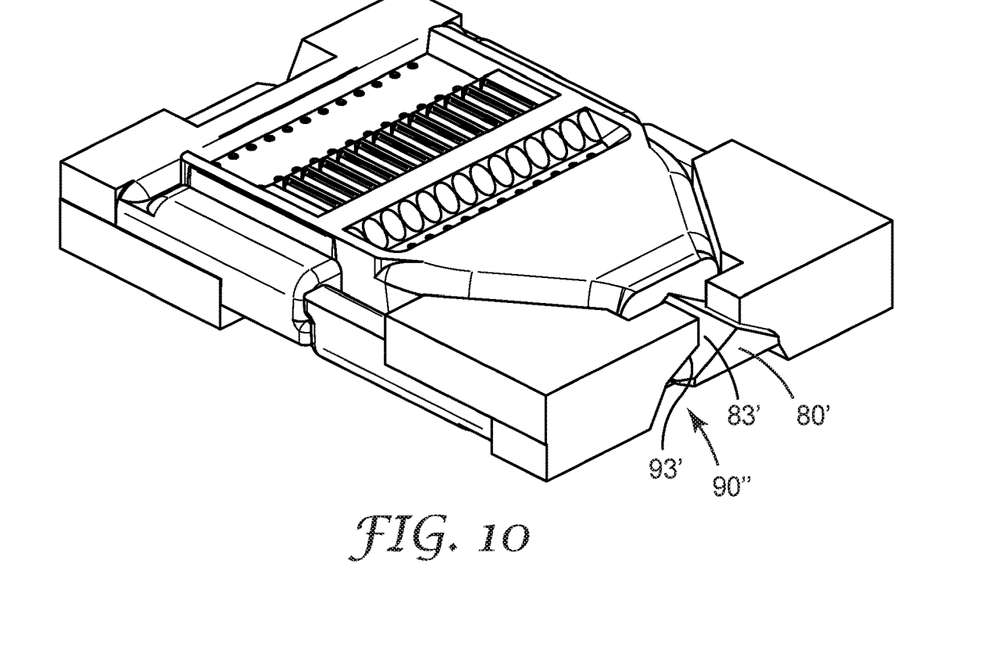
FIGS. 10-15 schematically show different assembled and exploded views of optical ferrules mated with each other according to some other embodiments of the disclosure.
Figure 12:
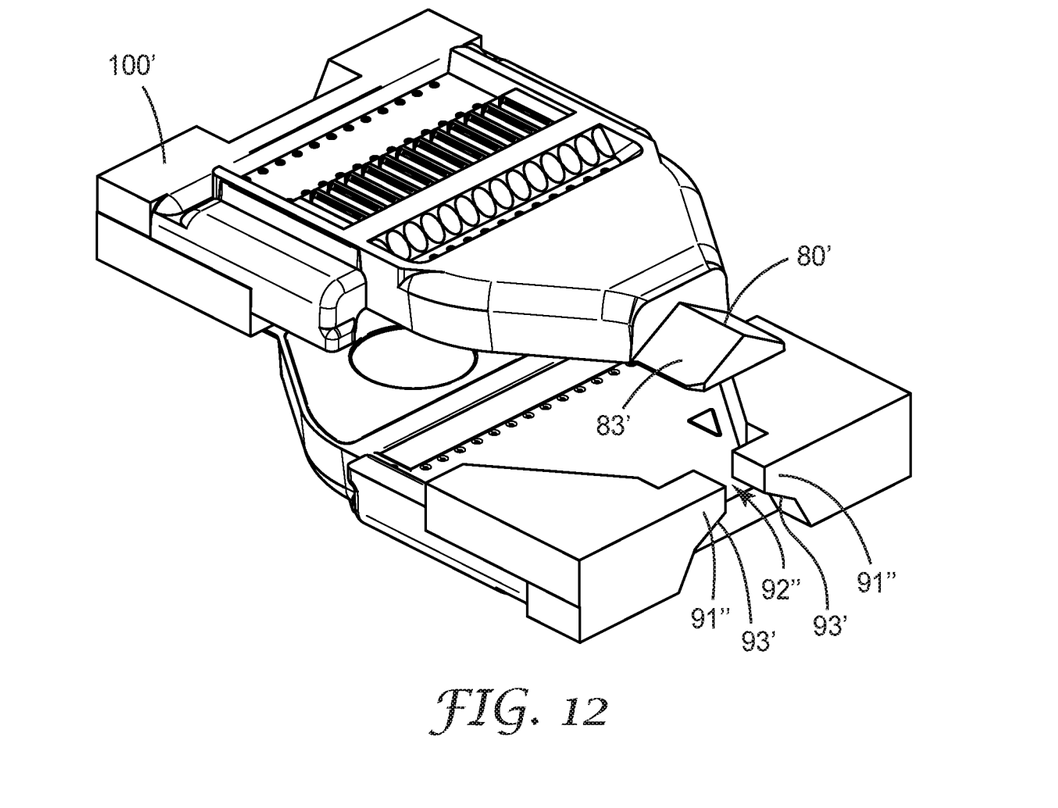

In some aspects, as illustrated in FIGS. 10 and 12, the second opening (90") may include opposing shoulders (91") configured to rest on the first projection (80') when the optical ferrules mate with each other. The opposing shoulders (91") may further define an air gap (92") therebetween. In other embodiments, as shown in FIGS. 7-9, the second opening (90') may be formed without an air gap and the second opening (90') may be shaped to conform to the contour of the prismatic first projection (80'), as best seen in FIG. 9.

Figure 11:
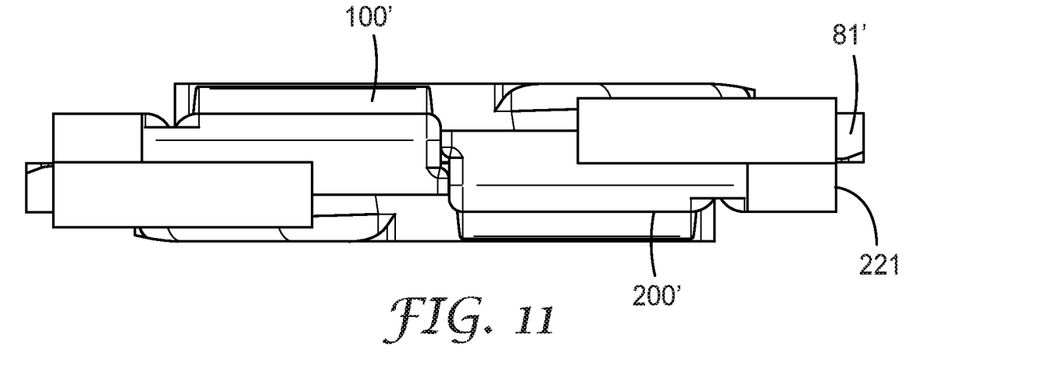
Figure 13:
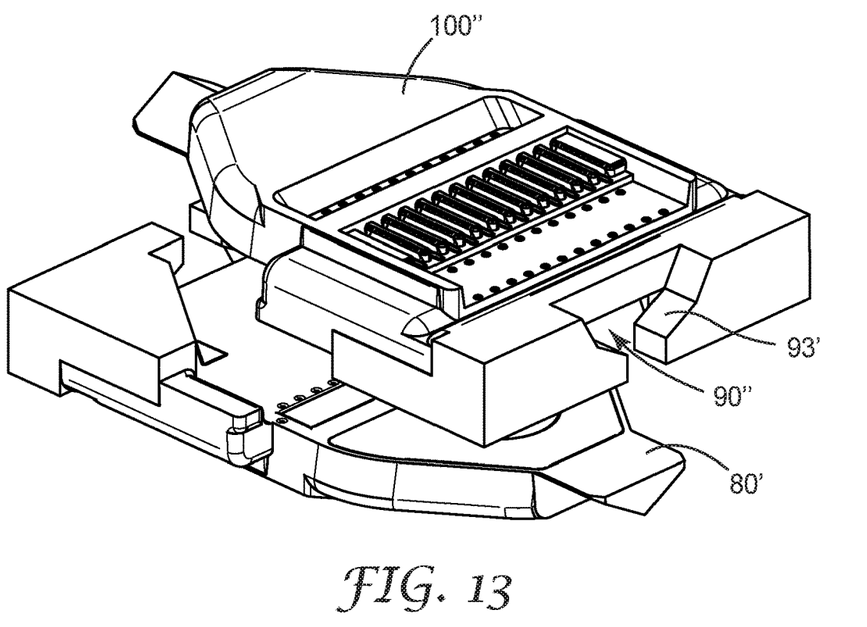

When the optical ferrule mates with the mating optical ferrule, the first projection (80') of the first engagement portion of each optical ferrule closely fits within the second opening (90', 90") of the second engagement portion of the other optical ferrule. For instance, as shown in FIGS. 10 and 12-13, a bottom surface (93') of the opposing shoulders (91") may be tapered to conform to a corresponding taper (83') formed in the first projection (80') of the first engagement portion. In other aspects, as best seen in FIG. 11, a portion (81') of the first projection (80') of the first engagement portion of each optical ferrule (100', 200') may extend beyond the rear end (221) of the other optical ferrule (100', 200'). The first projection (80') closely fits within the second opening (90', 90") so as to generate the pressing force for retaining the ferrules in the mated position. The pressing force generated prevents each of the optical ferules from moving relative to the other optical ferrule along at least mutually orthogonal first (y-axis) and second (z-axis) directions orthogonal to the length direction of the optical ferrule. During operation, the close fit between the first projection (80') of each optical ferrule and the second opening (90") of the other optical ferrule maintains the optical alignment of the ferrules in the mated condition. In other embodiments, in addition to preventing relative movement of the ferrules in the first and second directions, the engagement between the first projection (80') and the second opening (90") may prevent each of the optical ferules from rotating relative to the other optical ferrule.

In some other aspects, additional discrete retainers and/or external mechanisms may be assembled onto the mated ferrules to provide additional pressing force to maintain the mating of the ferrules at a constant forward and normal force.

Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

The invention claimed is:

1. An optical ferrule configured to mate with a mating optical ferrule and comprising:
   opposing top and bottom major surfaces, the top surface comprising an attachment portion for receiving and securing one or more optical waveguides, and a light redirecting portion for changing a direction of light received from an optical waveguide received and secured in the attachment portion; and
   first and second engagement portions disposed at respective front and rear ends of, and integral to, the optical ferrule and spaced apart along a length direction of the optical ferrule, such that when the optical ferrule mates with the mating optical ferrule comprising first and second engagement portions disposed at respective front and rear ends of, and integral to, the mating optical ferrule and spaced apart along a length direction of the mating optical ferrule, the first and second engagement portions of the optical ferrule engage the respective second and first engagement portions of the mating optical ferrule, thereby preventing each of the optical ferules from moving relative to the other optical ferrule along at least mutually orthogonal first and second directions orthogonal to the length direction of the optical ferrule.

2. The optical ferrule of claim 1, wherein the light redirecting portion changes the direction of light received from an optical waveguide received and secured in the attachment portion from the length direction of the optical ferrule to a different direction, wherein the first and second directions are respective width and thickness directions of the optical ferrule, and wherein the engagement between the first and second engagement portions of the optical ferrule and the respective second and first engagement portions of the mating optical ferrule prevents each of the optical ferules from rotating relative to the other optical ferrule.

3. The optical ferrule of claim 1, wherein the first engagement portion of each optical ferrule comprises a first inclined surface and the second engagement portion of each optical ferrule comprises a pair of second inclined surfaces spaced apart along a width direction of the optical ferrule, such that when the optical ferrule mates with the mating optical ferrule, the first inclined surface of the first engagement portion of each optical ferrule makes surface contact with each of the second inclined surfaces of the second engagement portion of the other optical ferrule.

4. The optical ferrule of claim 1, wherein the first engagement portion of each optical ferrule comprises a first projection and the second engagement portion of each optical ferrule defines a second opening, such that when the optical ferrule mates with the mating optical ferrule, the first projection of the first engagement portion of each optical ferrule closely fits within the second opening of the second engagement portion of the other optical ferrule, wherein the first projection comprises an inclined surface and the second opening comprises a pair of second inclined surfaces spaced apart along a width direction of the optical ferrule, and wherein the second opening comprises opposing shoulders configured to rest on the first projection, and wherein the opposing shoulders define an air gap therebetween.

5. The optical ferrule of claim 4, wherein when the optical ferrule mates with the mating optical ferrule, the first projection of the first engagement portion of each optical ferrule closely fits within the second opening of the second engagement portion of the other optical ferrule, and wherein a portion of the first projection of the first engagement portion of each optical ferrule extends beyond the rear end of the other optical ferrule.

6. The optical ferrule of claim 4, wherein the first projection tapers from a larger back end to a smaller front end.

7. The optical ferrule of claim 1 further comprising at least one mating stop integral to the optical ferrule and disposed between the first and second engagement portions, such that when the optical ferrule mates with the mating optical ferrule, the stop engages a corresponding mating stop of the mating optical ferrule preventing each of the optical ferules from further moving relative to the other optical ferrule along the length direction of the optical ferrule.

8. An optical ferrule configured to move along a mating direction to mate with a mating optical ferrule, the optical ferrule comprising an attachment portion for receiving and securing one or more optical waveguides; and first and second engagement portions formed integrally with the optical ferrule and spaced apart from each other along the mating direction, such that when the optical ferrule mates with the mating optical ferrule comprising first and second engagement portions formed integrally with the mating optical ferrule and spaced apart from each other along the mating direction, the first and second engagement portions of the optical ferrule engage the respective second and first engagement portions of the mating optical ferrule, thereby preventing each of the optical ferules from moving relative to the other optical ferrule along at least mutually orthogonal first and second directions orthogonal to the mating direction.

9. The optical ferrule of claim 8, wherein the first and second directions are respective width and thickness directions of the optical ferrule, wherein the engagement between the first and second engagement portions of the optical ferrule and the respective second and first engagement portions of the mating optical ferrule prevents each of the optical ferules from rotating relative to the other optical ferrule, and wherein the first and second engagement portions are disposed at respective front and rear ends of the optical ferrule.

10. The optical ferrule of claim 8 being hermaphroditic.

* * * * *

UNITED STATES PATENT AND TRADEMARK OFFICE
CERTIFICATE OF CORRECTION

PATENT NO. : 12,124,089 B2
APPLICATION NO. : 17/786023
DATED : October 22, 2024
INVENTOR(S) : Changbao Ma et al.

Page 1 of 1

It is certified that error appears in the above-identified patent and that said Letters Patent is hereby corrected as shown below:

In the Claims

Column 8

Line 8, In Claim 1, delete "optical ferules" and insert -- optical ferrules --, therefor.

Line 22, In Claim 2, delete "optical ferules" and insert -- optical ferrules --, therefor.

Line 63, In Claim 7, delete "optical ferules" and insert -- optical ferrules --, therefor.

Column 9

Line 13, In Claim 8, delete "optical ferules" and insert -- optical ferrules --, therefor.

Line 23, In Claim 9, delete "optical ferules" and insert -- optical ferrules --, therefor.

Signed and Sealed this
Twenty-fifth Day of March, 2025

Coke Morgan Stewart
*Acting Director of the United States Patent and Trademark Office*